United States Patent
Funada et al.

(10) Patent No.: US 10,782,042 B2
(45) Date of Patent: Sep. 22, 2020

(54) VENTILATION CONTROL APPARATUS AND VENTILATION SYSTEM

(71) Applicant: Panasonic Intellectual Property Management Co., Ltd., Osaka (JP)

(72) Inventors: Naoyuki Funada, Aichi (JP); Masayuki Sasaki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 2 days.

(21) Appl. No.: 16/069,577

(22) PCT Filed: Feb. 17, 2017

(86) PCT No.: PCT/JP2017/005877
§ 371 (c)(1),
(2) Date: Jul. 12, 2018

(87) PCT Pub. No.: WO2017/159208
PCT Pub. Date: Sep. 21, 2017

(65) Prior Publication Data
US 2019/0024929 A1    Jan. 24, 2019

(30) Foreign Application Priority Data

Mar. 17, 2016  (JP) ................. 2016-053355
Sep. 27, 2016  (JP) ................. 2016-187655

(51) Int. Cl.
*F24F 11/49*    (2018.01)
*F24F 7/007*    (2006.01)
(Continued)

(52) U.S. Cl.
CPC ............ *F24F 11/49* (2018.01); *F24F 7/007* (2013.01); *F24F 11/0001* (2013.01);
(Continued)

(58) Field of Classification Search
None
See application file for complete search history.

(56) References Cited

U.S. PATENT DOCUMENTS

| | | | |
|---|---|---|---|
| 2011/0223850 A1* | 9/2011 | Narayanamurthy | ...... F24F 3/14 454/239 |
| 2015/0207447 A1* | 7/2015 | Sato | ........... H02P 1/46 318/400.11 |
| 2018/0128511 A1* | 5/2018 | Motodani | ........... F24F 11/89 |

FOREIGN PATENT DOCUMENTS

| | | |
|---|---|---|
| CN | 104456813 A | 3/2015 |
| JP | 2004-028387 A | 1/2004 |

(Continued)

OTHER PUBLICATIONS

Kaneko, Masahiro, Machine translation of JP2010165331A, retrieved from <https://worldwide.espacenet.com/patent/search/family/042581409/publication/JP2010165331A?q=JP2010165331A> (Year: 2010).*

(Continued)

*Primary Examiner* — Kenneth M Lo
*Assistant Examiner* — Istiaque Ahmed
(74) *Attorney, Agent, or Firm* — Pearne & Gordon LLP

(57) ABSTRACT

Provided is a ventilation control apparatus (2) comprising: an in-home communication module configured to communicate with ventilators via an in-home network; an external communication module configured to communicate with an external server provided outside a building via an external network; a determination unit (77) configured to determine whether or not communication with the external server via the external communication module is available; a control determination unit (78) configured to determine a control method for the ventilators, based on a result of determination by the determination unit (77); and a ventilation operation control unit (76) configured to control the ventilators, based (Continued)

on the control method determined by the control determination unit (78).

9 Claims, 10 Drawing Sheets

(51) Int. Cl.
    *F24F 11/00*     (2018.01)
    *F24F 11/61*     (2018.01)
    *F24F 11/89*     (2018.01)
    *F24F 120/20*     (2018.01)

(52) U.S. Cl.
    CPC .............. *F24F 11/61* (2018.01); *F24F 11/89* (2018.01); *F24F 2120/20* (2018.01)

(56) References Cited

FOREIGN PATENT DOCUMENTS

| JP | 2010-165331 A | | 7/2010 |
|----|---------------|---|--------|
| JP | 2010165331 A | * | 7/2010 |
| JP | 2015-142403 A | | 8/2015 |
| JP | 2016-008794 A | | 1/2016 |

OTHER PUBLICATIONS

International Search Report Issued in Patent Application No. PCT/JP2017/005877 dated May 16, 2017.
Written Opinion Issued in Patent Application No. PCT/JP2017/005877 dated May 16, 2017.
International Preliminary Report on Patentability Issued in Patent Application No. PCT/JP2017/005877 dated Sep. 18, 2018.
English Translation of Chinese Search Report dated May 7, 2020 for the related Chinese Patent Application No. 201780010458.7.

* cited by examiner

FIG. 10

| Product information | | | Present information | | | |
|---|---|---|---|---|---|---|
| Product ID (main body) [51] | Exhaust capacity [58] | On-board sensor [52] | Present air-flow rate [53] | Sensor state [54] | Forced operation [55] | Power consumption [57] |
| FV15 | Rate 1:50cfm<br>Rate 2:70cfm<br>Rate 3:90cfm<br>Rate 4:110cfm<br>Rate 5:130cfm<br>Rate 6:150cfm | - Human sensor<br>- Humidity sensor | 110cfm | Non-detection | No | 6.0W |

(columns labeled 59, 47, 56)

FIG. 11

|  | Ventilation fan (exhaust capacity / W) | Range hood fan (exhaust capacity / W) | Pipe fan (exhaust capacity / W) | Total exhaust capacity (CFM) | Total power consumption (W) |
|---|---|---|---|---|---|
| Combination 62 | 50cfm/3W | 150cfm/15W | 30cfm/1W | 250CFM | 19W |
| Combination 63 | 70cfm/4W | 130cfm/11W | 30cfm/1W | 250CFM | 16W |
| Combination 64 | 90cfm/5W | 110cfm/9W | 30cfm/1W | 250CFM | 15W |
| .... | .... | .... | .... | 250CFM | .... |
| Combination 65 | 150cfm/8W | 50cfm/5W | 30cfm/1W | 250CFM | 14W |

VENTILATION CONTROL APPARATUS AND VENTILATION SYSTEM

TECHNICAL FIELD

The present invention relates to a ventilation control apparatus and a ventilation system.

BACKGROUND ART

There have been known ventilation systems having a plurality of ventilators configured to take air in a building such as a house from the outside and discharge air to the outside (for example, refer to Patent Literature 1).

A ventilation system described in Patent Literature 1 has a centralized control apparatus configured to stop the operation of an exhaust air blower as an example of a ventilator when a temperature measured by an outdoor temperature sensor is in a predetermined range, and configured to operate the exhaust air blower when the temperature falls outside the predetermined range. In addition to the exhaust air blower configured to discharge air in a living room of a building to the outside of the building, a sanitary exhauster installed in, for example, a bathroom or a washroom, a range hood fan, and an air conditioner are connected to the centralized control apparatus through a wired communication line. Furthermore, the centralized control apparatus is configured to operate the sanitary exhauster and the range hood fan as ventilation apparatus examples when the exhaust air blower is stopped, and configured to stop the operation of the sanitary exhauster and the range hood fan when the exhaust air blower is operated. With this configuration, exhaustion is performed as necessary to carry out round-the-clock ventilation, whereby excessive exhaustion can be prevented, resulting in a reduction in air conditioning energy loss.

CITATION LIST

Patent Literature 1: Japanese Unexamined Patent Application Publication No. 2016-8794

SUMMARY OF INVENTION

In the above-described ventilation system used for, for example, houses, a plurality of ventilators is connected to a ventilation control apparatus configured to exercise control over control target devices. Therefore, the ventilation control apparatus is capable of controlling the ventilators to have the ventilators work in cooperation with each other. For example, in the case where the ventilators to be used are ventilators made by a plurality of different manufactures, the ventilators made by different manufactures are controlled so as to work in cooperation with each other, by making use of an external server.

However, for example, typically in a new house, a ventilation control apparatus is usually not connected to an external network at the time of moving in. Therefore, in the case of a mechanism in which ventilators made by different manufactures are used, in other words, through the use of an external server, ventilators are caused to work in cooperation with each other, a cooperation function of the ventilation control apparatus cannot be offered, and each of the ventilators functions only as a ventilator. After moving in, a user makes a contract for an external network and the ventilation control apparatus is connected to the external network, and then, for example, a construction contractor needs to give the ventilation control apparatus to a setting for external server connection, again.

The present invention has been conceived to solve the above-described problem, and has an object of providing a ventilation control apparatus that dynamically changes control of ventilators in accordance with a connection state to an external server.

To solve the above-described problem, the ventilation control apparatus according to the present invention is communicably connected to a plurality of ventilators capable of carrying air between the inside and outside of a building, and configured to control operation of the ventilators. The ventilation control apparatus includes: an in-home communication module configured to communicate with the ventilators via an in-home network; and an external communication module configured to communicate with an external server provided outside the building via an external network. The ventilation control apparatus further includes: a determination unit configured to determine whether or not communication with the external server via the external communication module is available; a control determination unit configured to determine a control method of controlling the operation of the ventilators, based on a result of determination by the determination unit; and a ventilation operation control unit configured to control the ventilators, based on the control method determined by the control determination unit.

The ventilation control apparatus according to the present invention allows ventilators connected thereto to be individually controlled even when connection to an external server is not available, and allows the ventilators to be controlled to work in cooperation with each other when connection to an external server is available.

BRIEF DESCRIPTION OF DRAWINGS

FIG. 10 is a diagram illustrating an example of provided information on the ventilators according to the embodiment.

FIG. 11 is a diagram illustrating combinations of ventilators selected by the ventilation control apparatus according to the embodiment.

DESCRIPTION OF EMBODIMENTS

Figure 1:
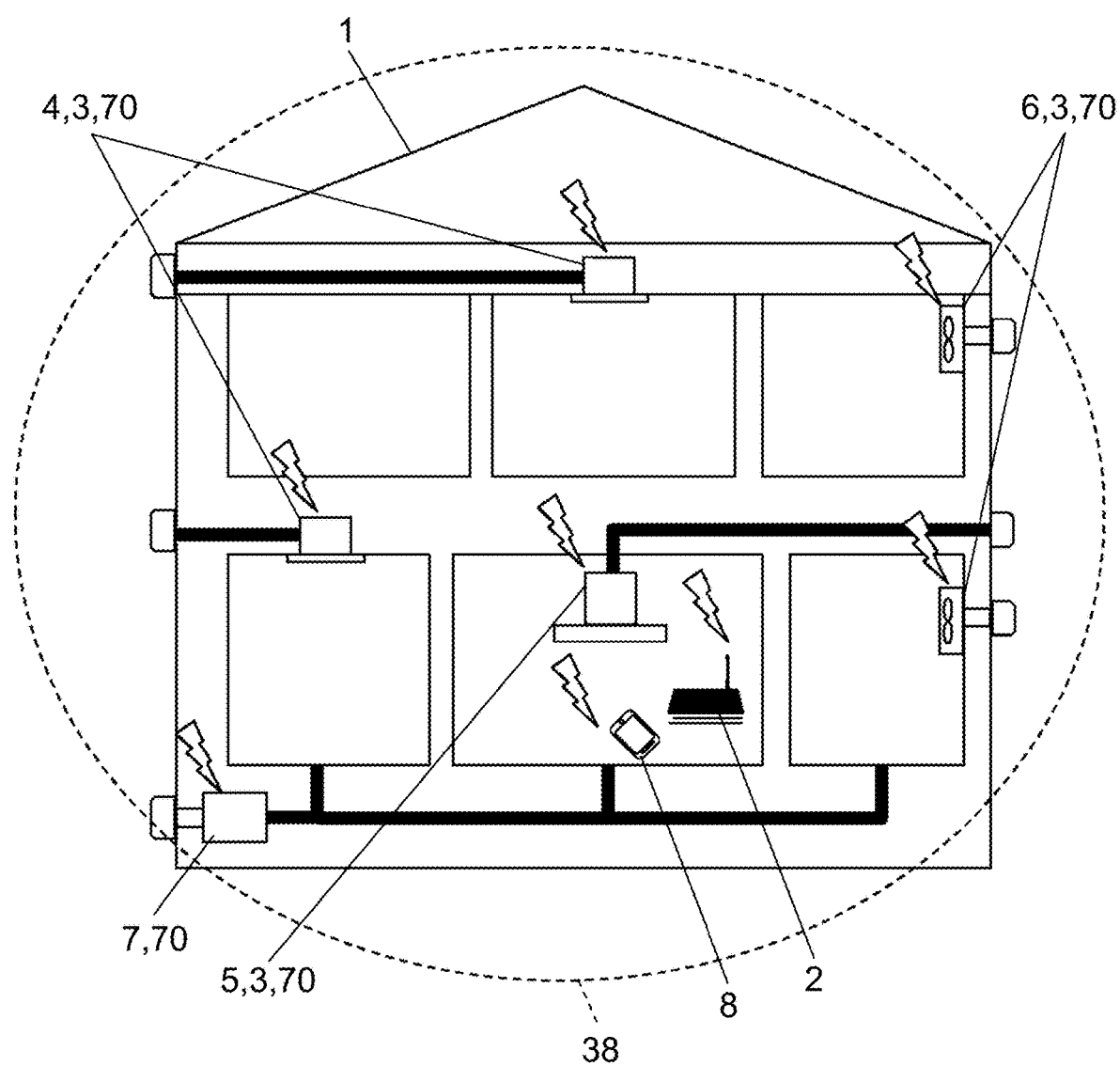
FIG. 1 is a schematic diagram of connection of an in-home network according to an embodiment.

Hereinafter, embodiments of the present invention will be described with reference to the drawings. Note that any of embodiments described below represent preferred a specific example of the present invention. Therefore, numerical values, shapes, materials, constituents, arrangement positions and connection forms of the constituents, and steps and the order of the step that are described in the following embodiments are merely exemplary and are not intended to limit the present invention. Therefore, of the constituents in the following embodiments, constituents not set forth in independent claims representing the most superordinate concept of the present invention are to be construed as optional constituents. Furthermore, in the drawings, substantially identical constituents are assigned the same reference signs, and overlapped descriptions thereof are omitted or simplified.

EMBODIMENTS

Figure 2:
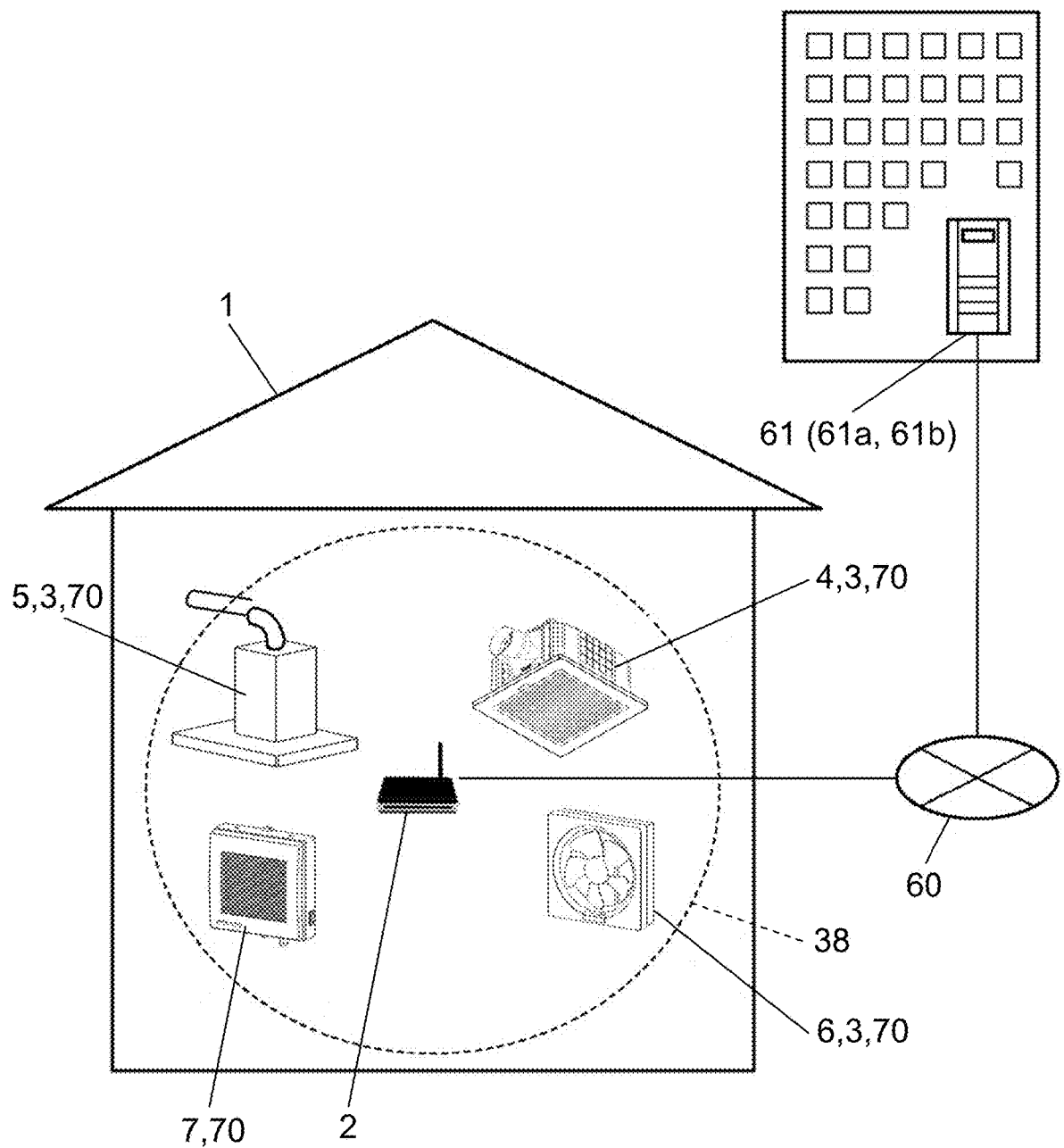
FIG. 2 is a schematic diagram of a ventilation control apparatus and an external server that are connected to each other via an external network according to the embodiment.

First, the outline of a ventilation system according to the present invention will be described with reference to FIG. 1 and FIG. 2. Note that FIG. 1 is a schematic diagram of connection of an in-home network according to the present embodiment. FIG. 2 is a schematic diagram of a ventilation control apparatus and an external server that are connected to each other via an external network according to the embodiment.

[Ventilation System]

The ventilation system according to the present embodiment includes ventilation control apparatus 2, exhauster 3, and air supply apparatus 7 configured to introduce the outside air into a house.

Ventilation control apparatus 2 is installed in ordinary house 1, and communicably connected to ceiling-embedded ventilation fan 4, wall-mounted ventilation fan 6, range hood fan 5, and air supply apparatus 7, via in-home network 38. Ventilation control apparatus 2 is communicably connected to external server 61 via external network 60. Ventilation control apparatus 2 is communicably connected, for example, to a plurality of ventilators 70 provided in the house and to external server 61, and the connection may be wired or may be wireless.

Examples of exhauster 3 include ceiling-embedded ventilation fan 4, wall-mounted ventilation fan 6, range hood fan 5, and a heat exchange ventilation fan (not illustrated). In other words, exhauster 3 is an apparatus having an exhaust function with which to perform exhaust from the inside to the outside of ordinary house 1.

Examples of air supply apparatus 7 include an air supply function of a heat exchange ventilation fan and an air supply fan. In other words, air supply apparatus 7 is an apparatus having an air supply function with which to supply air from the outside to the inside of ordinary house 1. Note that air supply apparatus 7 does not necessarily have a fan, and is only required to have, for example, an air duct that communicates with the inside and outside of the house, and an opening-and-closing section for opening and closing the air duct, and to be capable of electrically opening and closing the opening-and-closing section.

Examples of ventilators 70 include exhauster 3 and air supply apparatus 7. In other words, ventilator 70 is an apparatus having at least one function of exhaustion and air supply.

Information input terminal 8 is communicably connected to ventilation control apparatus 2 via in-home network 38 or external network 60. Information input terminal 8 is to cause ventilation control apparatus 2 to store necessary information for constituting the ventilation system of the present embodiment. Examples of information input terminal 8 include terminals, such as a mobile phone, a smartphone, and a tablet.

Figure 3:
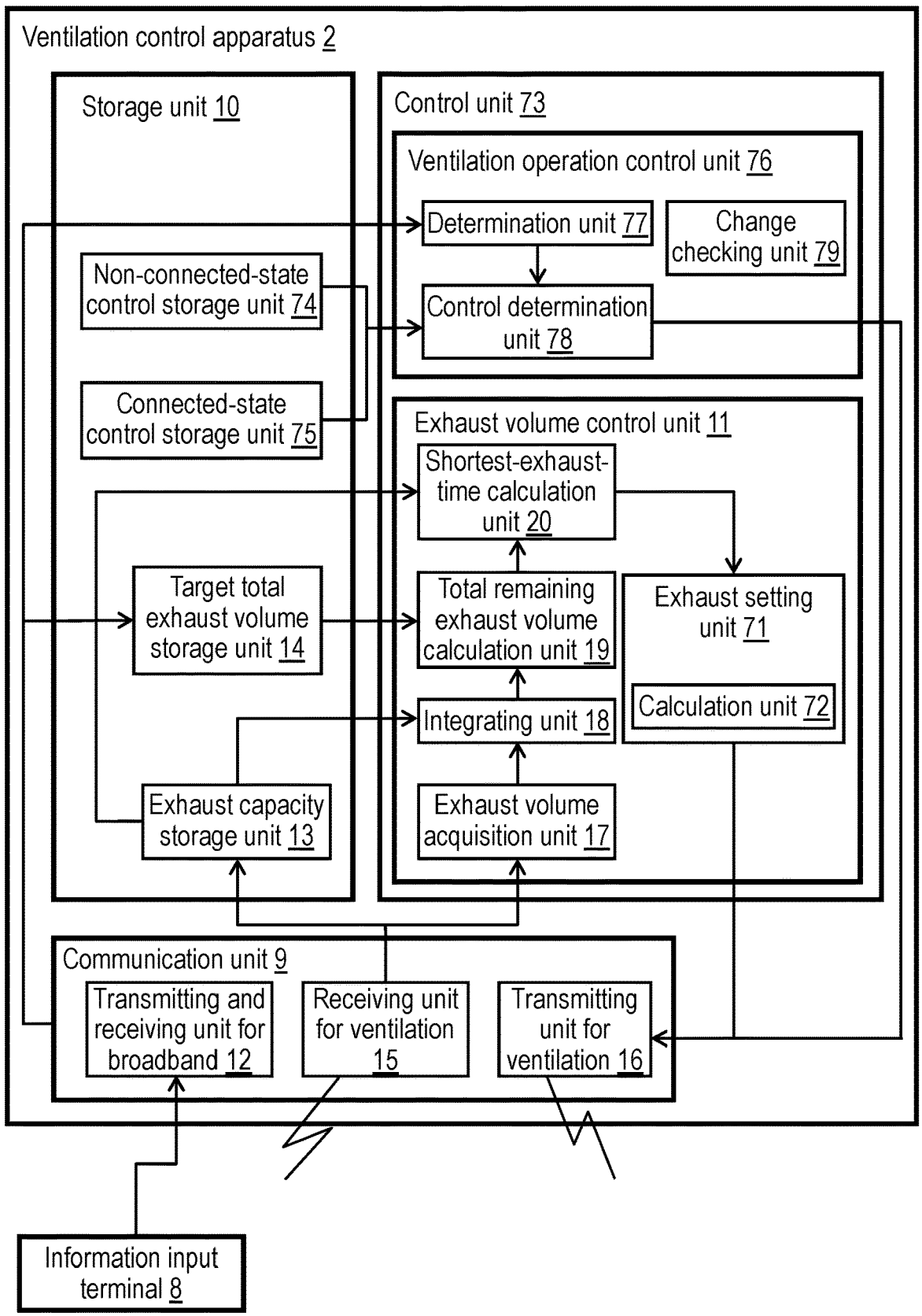
FIG. 3 is a schematic functional block diagram of the ventilation control apparatus according to the embodiment.
Figure 4:
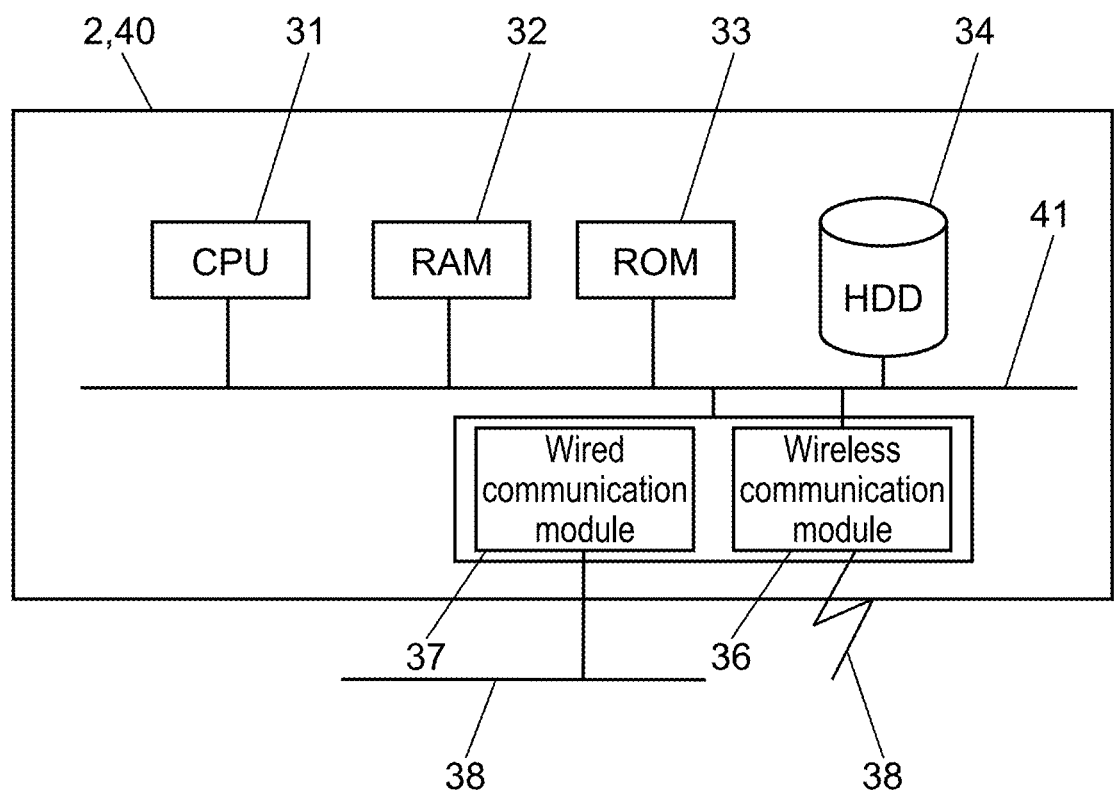
FIG. 4 is a configuration diagram of the ventilation control apparatus according to the embodiment.
Figure 5:
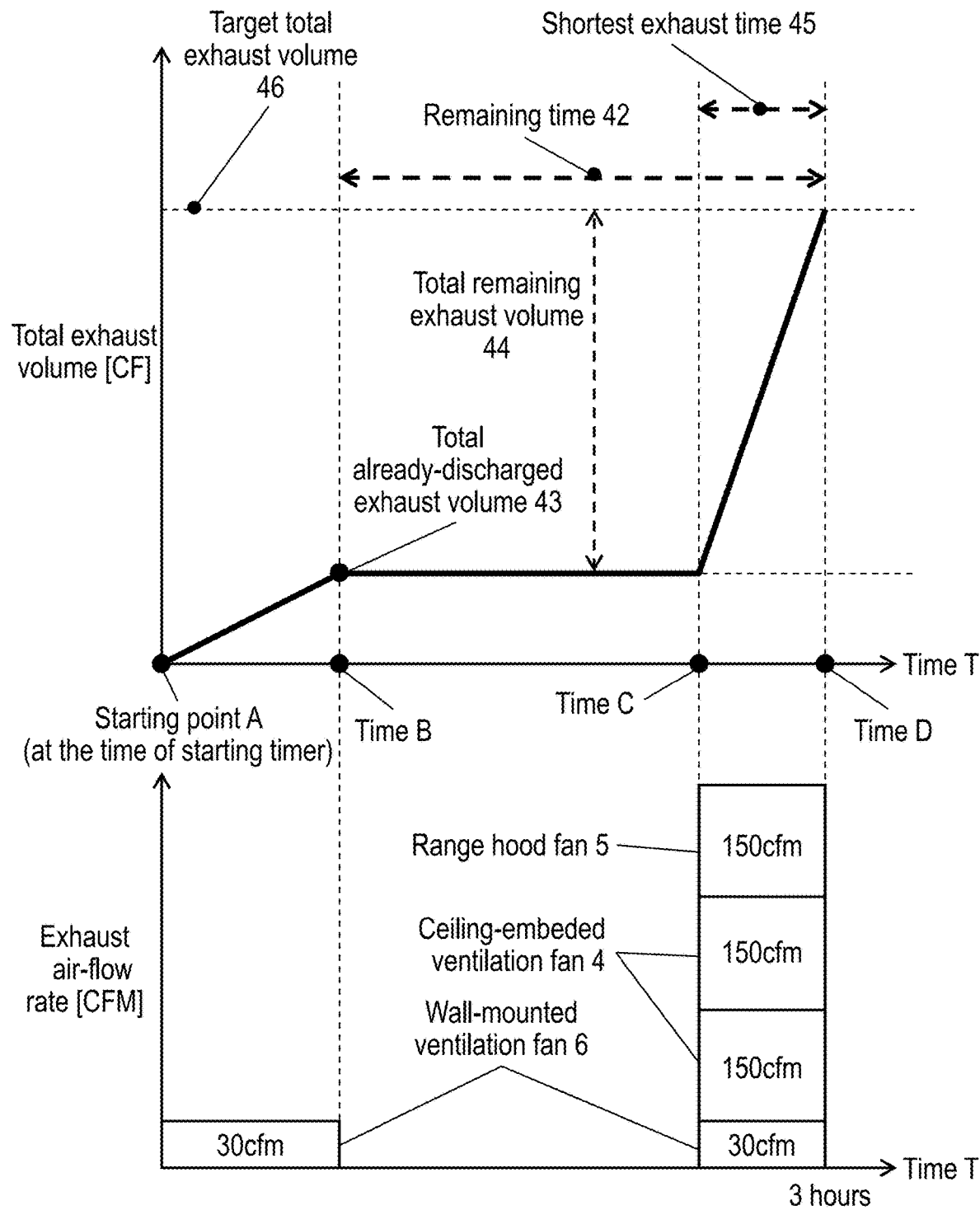
FIG. 5 is a graph illustrating an example of the operation of ventilators controlled by the ventilation control apparatus according to the embodiment.

Next, functions constituting ventilation control apparatus 2, ceiling-embedded ventilation fan 4, wall-mounted ventilation fan 6, range hood fan 5, and air supply apparatus 7 will be described with reference to FIG. 3, FIG. 4, and FIG. 5. Note that FIG. 3 is a schematic functional block diagram of ventilation control apparatus 2 according to the embodiment. FIG. 4 is a configuration diagram of ventilation control apparatus 2 according to the embodiment. FIG. 5 is a graph illustrating an example of the operation of ventilators controlled by ventilation control apparatus 2 according to the embodiment.

[Ventilation Control Apparatus]

As illustrated in FIG. 3, ventilation control apparatus 2 includes communication unit 9, storage unit 10, and control unit 73. Control unit 73 includes ventilation operation control unit 76 and exhaust volume control unit 11.

Communication unit 9 includes: transmitting and receiving unit for broadband 12 that is communicably connected to information input terminal 8 and external server 61; receiving unit for ventilation 15 configured to receive a radio signal from each of ventilators 70; and transmitting unit for ventilation 16 configured to wirelessly give operation instructions to each of ventilators 70. That is, transmitting and receiving unit for broadband 12 corresponds to an external communication module. Receiving unit for ventilation 15 and transmitting unit for ventilation 16 each correspond to in-home communication modules. As a matter of course, transmitting and receiving unit for broadband 12, receiving unit for ventilation 15, and transmitting unit for ventilation 16 may be integrally configured as long as the functions of the units are provided.

Figure 6:
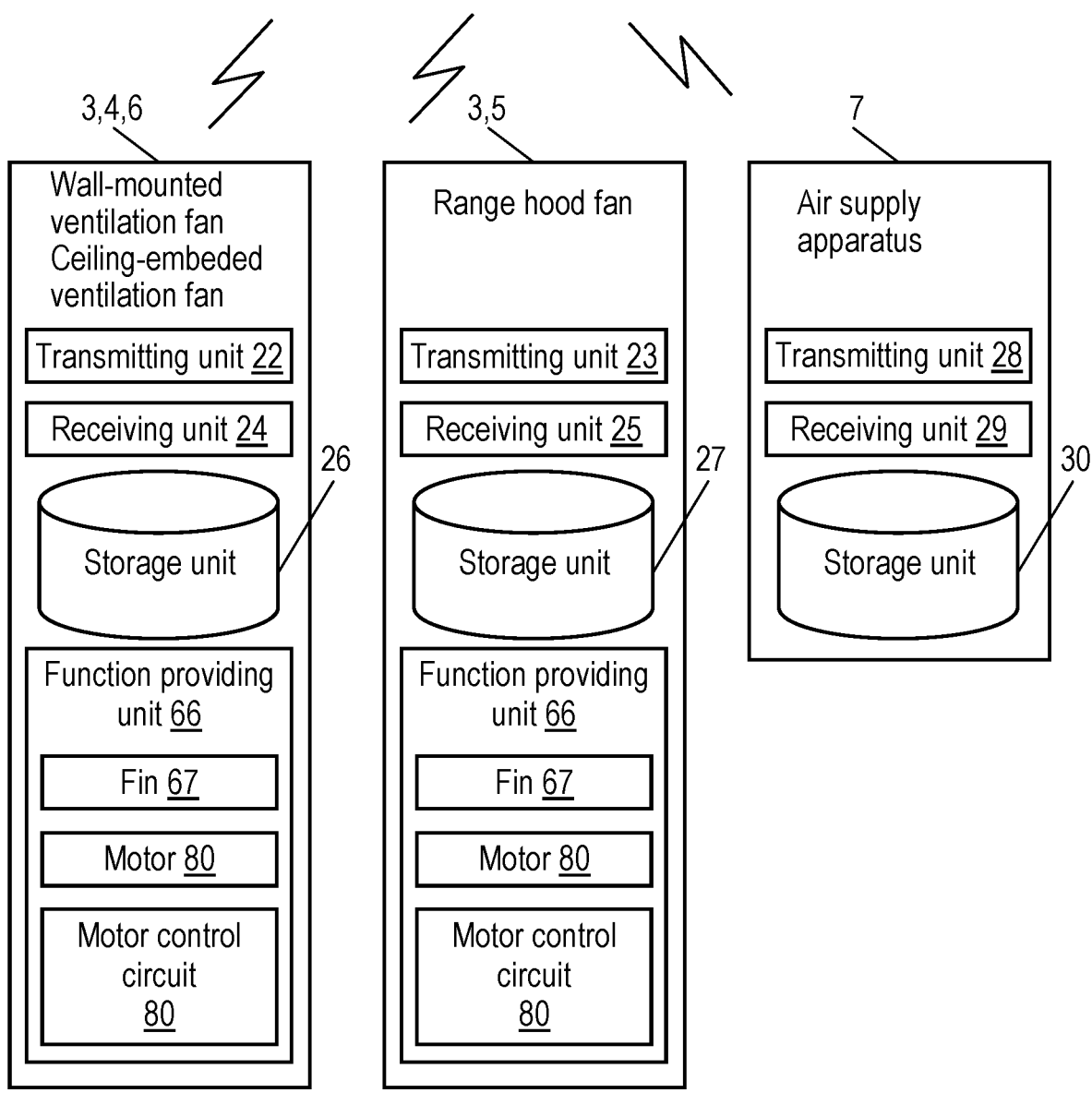
FIG. 6 is a schematic functional block diagram of the ventilators according to the embodiment.

Receiving unit for ventilation 15 receives radio signals transmitted from transmitting units 22 of ceiling-embedded ventilation fan 4 and wall-mounted ventilation fan 6 (refer to FIG. 6), transmitting unit 23 of range hood fan 5 (refer to FIG. 6), and transmitting unit 28 of air supply apparatus 7 (refer to FIG. 6).

Transmitting unit for ventilation 16 transmits radio signals telling operations on which control unit 73 instructs ventilators 70, to receiving units 24 of ceiling-embedded ventilation fan 4 and wall-mounted ventilation fan 6 (refer to FIG. 6), receiving unit 25 of range hood fan 5 (refer to FIG. 6), and receiving unit 29 of air supply apparatus 7 (refer to FIG. 6).

Storage unit 10 includes non-connected-state control storage unit 74, connected-state control storage unit 75, target total exhaust volume storage unit 14, and exhaust capacity storage unit 13, and is capable of reading and writing information used for processing by control unit 73 as necessary.

Non-connected-state control storage unit 74 stores, as a non-connected-state control program, a procedure for controlling ventilators 70, that is, a control specification in the case where ventilation control apparatus 2 is not connected to external server 61. Note that the case where ventilation control apparatus 2 is not connected to external server 61 means a case where ventilation control apparatus 2 cannot communicate with external server 61. Examples of the above-mentioned case include a case in which, even when external server 61 works, ventilation control apparatus 2 cannot communicate with external server 61 due to the absence of a contract for connection to external network 60 or a trouble in external network 60.

Connected-state control storage unit 75 stores, as a connected-state control program, a procedure for controlling ventilators 70, that is, a control specification in the case where ventilation control apparatus 2 is connected to external server 61. Note that the case where ventilation control apparatus 2 is connected to external server 61 means a case where ventilation control apparatus 2 can normally communicate with external server 61.

Target total exhaust volume storage unit 14 acquires a target total exhaust volume in a house, the volume being inputted to information input terminal 8, via communication unit 9, namely, transmitting and receiving unit for broadband 12 or in-home network 38. In other words, for example, a user sets a target total exhaust volume in a house by making use of information input terminal 8, so that the target total exhaust volume set by the user is stored in target total exhaust volume storage unit 14. As a matter of course, the target total exhaust volume varies depending on, for example, the size of a house, the number of rooms thereof, the airtightness thereof, and the thermal insulating properties thereof. Hence, different values of the target total exhaust volume are set for different houses. The target total exhaust volume is a total volume of exhaust that should be discharged from a predetermined house within a predetermined time. The predetermined time used herein is, for example, one day (24 hours) or 3 hours, and thus varies depending on environments or agreements specified in laws and regulations. Therefore, in the present embodiment, the predetermined time is a time that a user can arbitrarily set in accordance with laws and regulations, such as environmental standards and ventilation standards for a house in which ventilators 70 are installed, or environmental conditions specific to the house, that is, 3 hours as an example.

Exhaust capacity storage unit 13 stores the exhaust capacity of at least one exhauster 3 connected to ventilation control apparatus 2. Examples of the exhaust capacity include the maximum exhaust volume per unit time of exhauster 3. Furthermore, in the case where the exhaust capacity (exhaust setting) of exhauster 3 can be set at a plurality of levels, a setting of exhaust capacity and exhaust volume per unit time in this setting may correspond to each other to be stored. Examples of the setting of exhaust capacity include Rate 1, Rate 2, weak, medium, and strong. The exhaust capacity may be inputted, for example from information input terminal 8, or may be acquired by an inquiry from control unit 73 to newly connected exhauster 3 and stored in exhaust capacity storage unit 13. For the purpose of balancing between exhaust volume and air supply volume as mentioned later, exhaust capacity storage unit 13 may also store the air supply capacity of air supply apparatus 7 as well as exhaust capacity.

Ventilation operation control unit 76 includes determination unit 77, control determination unit 78, and change checking unit 79.

Determination unit 77 determines, via transmitting and receiving unit for broadband 12, that is, an external communication module, whether or not communication with external server 61 is available. Here, when receiving a normal answer from external server 61, determination unit 77 determines that communication with external server 61 is available, that is, Yes. In contrast, when not receiving a normal answer from external server 61, determination unit 77 determines that communication with external server 61 is not available, that is, No.

Control determination unit 78 determines a method for controlling ventilators 70, based on a result of determination by determination unit 77. In the present embodiment, control determination unit 78 receives a result of determination by determination unit 77, and if the result indicates that communication with external server 61 is available, control determination unit 78 determines to apply a control method that uses a connected-state control program stored in connected-state control storage unit 75. In contrast, if the result indicates that communication with external server 61 is not available, control determination unit 78 determines to apply a control method that uses a non-connected-state control program stored in non-connected-state control storage unit 74.

Change checking unit 79 makes access to external server 61 when determination unit 77 determines that communication with external server 61 is available. In external server 61, the latest non-connected-state control program, the latest connected-state control program, and values determined by laws and regulations of environmental standards and ventilation standards for houses are stored. Change checking unit 79 makes access to external server 61 to confirm whether or not the above-mentioned programs have been changed. When any change in the above-mentioned programs is confirmed, the corresponding program and others are updated. Specifically, the non-connected-state control program or the connected-state control program that are stored in storage unit 10 are updated. When a change in a value related to ventilation control among the values determined by laws and regulations of environmental standards and ventilation standards for houses is confirmed, the value stored in storage unit 10 and related to ventilation control is updated. Specifically, examples of the value related to ventilation control include the above-described target total exhaust volume, that is, the total volume of exhaust to be discharged from a predetermined house within a predetermined time, and the predetermined time.

Ventilation operation control unit 76 controls ventilators 70, based on a control method determined by control determination unit 78. In the present embodiment, ventilation operation control unit 76 transmits a control command to each of ventilators 70 via transmitting unit for ventilation 16 by executing a control method that control determination unit 78 has determined to employ, that is, the non-connected-state control program or the connected-state control program. Note that specific contents transmitted will be described later.

Exhaust volume control unit 11 includes exhaust volume acquisition unit 17, integrating unit 18, total remaining exhaust volume calculation unit 19, shortest-exhaust-time calculation unit 20, exhaust setting unit 71, and calculation unit 72.

Exhaust volume acquisition unit 17 acquires an already-discharged exhaust volume, that is, the volume of exhaust having been already discharged from each of exhausters 3 connected to ventilation control apparatus 2. Here, the already-discharged exhaust volume is acquired in the following manner, for example.

That is, at a timing when exhauster 3 starts exhausting, exhaust volume acquisition unit 17 receives an exhaust volume per unit time from exhauster 3 via communication unit 9. Furthermore, at a timing when exhauster 3 changes an exhaust volume setting, exhaust volume acquisition unit 17 receives the changed exhaust volume per unit time from exhauster 3 via communication unit 9. Furthermore, at a timing when exhauster 3 stops exhausting, exhaust volume acquisition unit 17 receives a notification about the stop from exhauster 3 via communication unit 9. When receiving these, exhaust volume acquisition unit 17 multiplies an exhaust volume per unit time by a time period of operation with the exhaust volume to acquire the volume of exhaust having been already discharged by exhauster 3.

As another method, exhaust volume acquisition unit 17 may make an inquiry about an already-discharged exhaust volume to each of exhausters 3 via communication unit 9 at predetermined time intervals. In response to this inquiry, each of exhausters 3 sends a reply to exhaust volume acquisition unit 17 via communication unit 9 with the volume of exhaust having been already discharged from the previous inquiry to this inquiry.

When the above-mentioned processing is performed for all exhausters 3 connected to ventilation control apparatus 2, exhaust volume acquisition unit 17 can acquire the volume of exhaust having been already discharged from each of exhausters 3.

Integrating unit 18 acquires all the already-discharged exhaust volumes acquired by exhaust volume acquisition unit 17, at predetermined time intervals, and adds up the volumes, in other words, integrates the volumes. Thus, total already-discharged exhaust volume 43 (refer to FIG. 5) discharged from a house via all exhausters 3 connected to ventilation control apparatus 2 can be calculated.

Total remaining exhaust volume calculation unit 19 subtracts total already-discharged exhaust volume 43 calculated by integrating unit 18 from a target total exhaust volume per predetermined time that is stored in target total exhaust volume storage unit 14, whereby total remaining exhaust volume 44 (refer to FIG. 5), that is, a total exhaust volume short of the target total exhaust volume is calculated. Here, a timing when total remaining exhaust volume calculation unit 19 calculates total remaining exhaust volume 44, of course, within a range of a time shorter than a predetermined time for which the target total exhaust volume is set.

Shortest-exhaust-time calculation unit 20 calculates shortest exhaust time 45 (refer to FIG. 5), that is, a time required to achieve a target total exhaust volume when exhaustion is performed with the maximum exhaust capacities of all exhausters 3 connected to ventilation control apparatus 2, the capacities having been stored in exhaust capacity storage unit 13.

Exhaust setting unit 71 calculates remaining time 42 (refer to FIG. 5), that is, the remaining time to a predetermined time required for achieving target total exhaust volume 46, by using the predetermined time required for achieving target total exhaust volume 46 (refer to FIG. 5) and time B (refer to FIG. 5) at which total already-discharged exhaust volume 43 is calculated. As illustrated in FIG. 5, remaining time 42 is calculated by subtracting the time elapsed from starting point A to time B (for example, 30 minutes) from time D, that is, the predetermined time (for example, 3 hours). This remaining time 42 is the time left to achieve target total exhaust volume 46. Remaining total exhaust volume 44, that is, a total exhaust volume short of target total exhaust volume 46 is calculated by total remaining exhaust volume calculation unit 19. Thus, from remaining time 42 and total remaining exhaust volume 44, ventilation control apparatus 2 can determine, for example, how much average exhaust volume is required for operating exhausters 3 during remaining time 42. Note that, details about how to operate exhausters 3 during remaining time 42 will be described later, but, for example, there may be employed a control pattern in which all exhausters 3 are operated at the maximum exhaust air-flow rate until the remaining exhaust volume is discharged. This allows target total exhaust volume 46 to be achieved in the shortest time. As a matter of course, if there are no other restrictions, exhausters 3 are operated during remaining time 42 preferably with high energy efficiency, that is, with energy saving. In such a case, calculation unit 72 makes a calculation to determine the optimal control pattern of each of ventilators 70, based on the energy consumption and exhaust air-flow rate of ventilator 70. When the control pattern is determined, exhaust setting unit 71 transmits an operation command to each of ventilators 70 via transmitting unit for ventilation 16 to control ventilators 70.

Note that operation of each unit will be described later using a flowchart.

As illustrated in FIG. 4, ventilation control apparatus 2 is provided as microcomputer 40. Microcomputer 40 includes central processing unit 31 (CPU), random access memory 32 (RAM), and read only memory 33 (ROM) thereinside, and further includes hard disk drive 34 (HDD) as storage unit 10. Microcomputer 40 further includes wired communication module 37 and wireless communication module 36. Wired communication module 37 and wireless communication module 36 function as communication units 9, and are connected to CPU 31, RAM 32, ROM 33, and HDD 34 via internal bus 41. For example, CPU 31 makes use of RAM 32 as a workspace, executes a program stored in ROM 33, and transmits and receives data and commands to/from storage unit 10 and devices, based on the result of the execution, thereby controlling the operation of the devices.

Control unit 73 and units belonging to control unit 73 are programs stored in ROM 33 and HDD 34, and execute predetermined processing when executed by CPU 31. HDD 34, ROM 33, and RAM 32 are not necessarily required to be used, and other types of memories may be used instead as long as they function as memories.

Devices such as wireless communication module 36 and wired communication module 37 are not necessarily provided in microcomputer 40, and may be externally connected.

Figure 7:
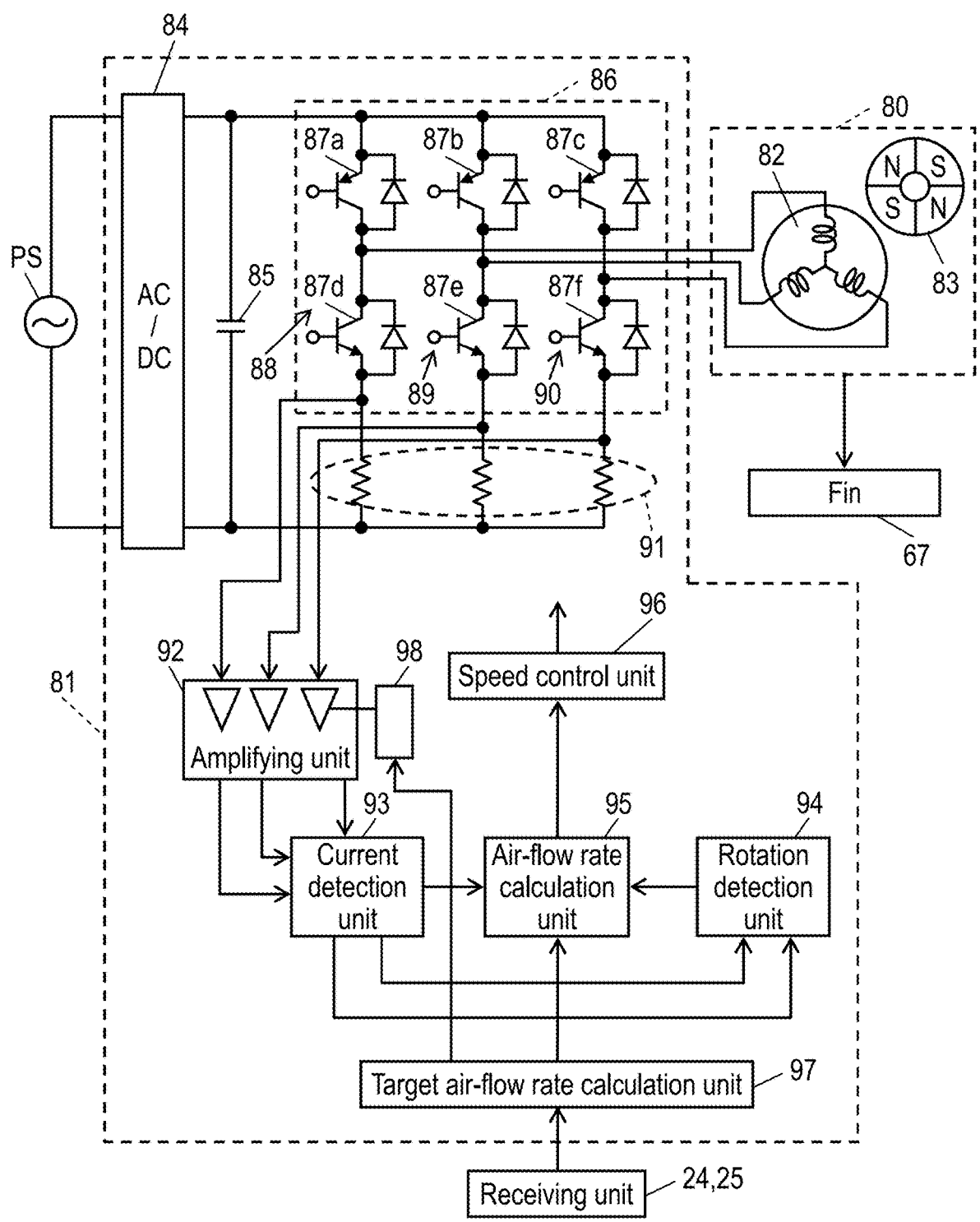
FIG. 7 is a configuration diagram of a function providing unit of an exhauster according to the embodiment.

Next, functions constituting exhausters 3 and air supply apparatus 7 will be described with reference to FIG. 6 and FIG. 7. Note that FIG. 6 is a schematic functional block diagram of ventilators 70 according to the embodiment. FIG. 7 is a configuration diagram of function providing unit 66 of exhauster 3 according to the embodiment.

[Exhauster and Air Supply Apparatus]

As illustrated in FIG. 6, ceiling-embedded ventilation fan 4 and wall-mounted ventilation fan 6, which are examples of exhauster 3, each include transmitting unit 22, receiving unit 24, and storage unit 26. Range hood fan 5 as another example of exhauster 3 includes transmitting unit 23, receiving unit 25, and storage unit 27. Air supply apparatus 7 includes transmitting unit 28, receiving unit 29, and storage unit 30.

For example, receiving unit 24 and receiving unit 25 of exhauster 3 receive an operation command from control unit 73 constituting ventilation control apparatus 2 via communication unit 9. The operation command that exhauster 3 receives is, for example, a command for transmitting provided information, or target air-flow rate Qs. Receiving unit 29 of air supply apparatus 7 receives an operation command from control unit 73 via communication unit 9. The operation command that air supply apparatus 7 receives is, for example, a command for transmitting provided information, or a command for opening and closing a vent.

In response to the above-mentioned command for transmitting provided information, for example, transmitting unit 22 and transmitting unit 23 read provided information from storage unit 26 and storage unit 27, and transmits the information to ventilation control apparatus 2 via in-home network 38 by wireless communication.

Storage unit 26 and storage unit 27 stores provided information that may be possibly required from ventilation control apparatus 2. Examples of provided information that is stored in storage unit 26 and storage unit 27 include, but are not limited to, an operation state indicating whether or not, for example, ceiling-embedded ventilation fan 4 is in operation, an exhaust volume setting of ceiling-embedded ventilation fan 4 or others (for example, weak, medium, strong) if in operation, and an exhaust air-flow rate per unit time that corresponds to the exhaust volume setting.

Note that not only ceiling-embedded ventilation fan 4, but also wall-mounted ventilation fan 6, range hood fan 5, air supply apparatus 7, and other various exhausters and air supply apparatuses basically have the above-mentioned configuration to be connected to ventilation control apparatus 2 to function.

Ceiling-embedded ventilation fan 4, wall-mounted ventilation fan 6, and range hood fan 5 each further include function providing unit 66 configured to provide an air blow function.

When receiving the above-mentioned target air-flow rate Qs from ventilation control apparatus 2 via receiving unit 24 or receiving unit 25, function providing unit 66 performs exhaustion with an air-flow rate corresponding to the target air-flow rate Qs. In other words, as illustrated in FIG. 7, function providing unit 66 includes fin 67, motor 80 formed of a sensorless brushless DC motor configured to rotate fin 67, and motor control circuit 81 configured to drive motor 80. Motor 80 includes stator 82 wound with a winding and rotor 83 having a magnet.

In FIG. 7, motor control circuit 81 converts an alternating-current (AC) voltage supplied from commercial power supply PS into a direct-current (DC) voltage in alternating-current conversion circuit 84. The converted DC voltage is smoothed by smoothing capacitor 85, and the smoothed DC voltage is applied to inverter circuit 86. Inverter circuit 86 has six switching-elements 87a to 87f, and controls each of switching element 87a to 87f to drive motor 80 formed of the sensorless brushless DC motor is.

Inverter circuit 86 is configured with first arm 88, second arm 89, and third arm 90, the arms being connected in a three-phase bridge form. Here, first arm 88 includes switching element 87a and switching element 87d, the elements being connected in series. Second arm 89 includes switching element 87b and switching element 87e, the elements being connected in series. Third arm 90 includes switching element 87c and switching element 87f, the elements being connected in series. In the present embodiment, each of switching element 87a, switching element 87b, and switching element 87c is arranged on the upper stage of a corresponding one of the arms. Furthermore, each of switching element 87d, switching element 87e, and switching element 87f is arranged on the lower stage of a corresponding one of the arms. The switching elements arranged on the upper stages and the switching elements arranged on the lower stages repeatedly perform ON/OFF operations by turns, thereby changing the direction of current passing through a winding of motor 80. Inverter circuit 86 is pulse-width-modulation (PWM)-controlled in accordance with a duty ratio inputted from later-mentioned speed control unit 96.

Between the lower stage of each phase (the lower stage of each arm) of inverter circuit 86 and the negative potential side of inverter circuit 86 (the ground of motor control circuit 81), shunt resistance 91 is inserted in every phase. Amplifying unit 92 amplifies a potential difference between both ends of shunt resistance 91, the potential difference being caused by a current passing through shunt resistance 91.

Amplifying unit 92 outputs, to current detection unit 93, the amplified potential difference between both ends of shunt resistance 91. From a value inputted from amplifying unit 92, current detection unit 93 detects a current in each phase that passes through motor 80, and outputs the current to rotation detection unit 94. Then, rotation detection unit 94 detects the rotational speed of motor 80 and the position of rotor 83, based on the current detected by current detection unit 93.

Any one of the current values in the phases, the values having been detected by current detection unit 93 and the rotational speed detected by rotation detection unit 94, are inputted into air-flow rate calculation unit 95 serving as a comparison unit. Air-flow rate calculation unit 95 respectively compares any one of the current values in the phases, the values having been detected by current detection unit 93, and the rotational speed having been detected by rotation detection unit 94 with a current value (a target current value) and the rotational speed (a target rotational speed) that correspond to target air-flow rate Qs. In other words, air-flow rate calculation unit 95 compares any one of the current values in the phases, the values having been detected by current detection unit 93, with a current value corresponding to target air-flow rate Qs, and compares the rotational speed detected by rotation detection unit 94 with the rotational speed corresponding to target air-flow rate Qs. Then, based on the comparison result, air-flow rate calculation unit 95 determines whether an air blowing rate is higher or lower than target air-flow rate Qs, and transmits the determination result to speed control unit 96.

Target air-flow rate calculation unit 97 receives target air-flow rate Qs from control unit 73 illustrated in FIG. 3 via receiving unit 24 or receiving unit 25, and transmits this target air-flow rate Qs to air-flow rate calculation unit 95 and amplification factor changing unit 98.

Amplification factor changing unit 98 changes the amplification factor of amplifying unit 92 in a predetermined phase, in accordance with the level of this target air-flow rate Qs.

Speed control unit 96 changes a duty ratio for inverter circuit 86, based on the result of comparison by air-flow rate calculation unit 95, thereby controlling the rotational speed of motor 80 formed of a sensorless brushless DC motor. Then, motor 80 varies the rotational speed to output a required air-flow rate.

With the above-described configuration, function providing unit 66 constituting exhauster 3 can keep an air-flow rate constant only with given target air-flow rate Qs, without changing resistance (pressure loss) of a duct connecting exhauster 3 to the outside of a building.

[In-Home Network]

In-home network 38 configured to connect ventilation control apparatus 2, exhauster 3, and air supply apparatus 7 is, for example, digital enhanced cordless telecommunications or wireless communications using Wi-FI (registered trademark) system.

[Checking of Connection to External Server]

Figure 8:
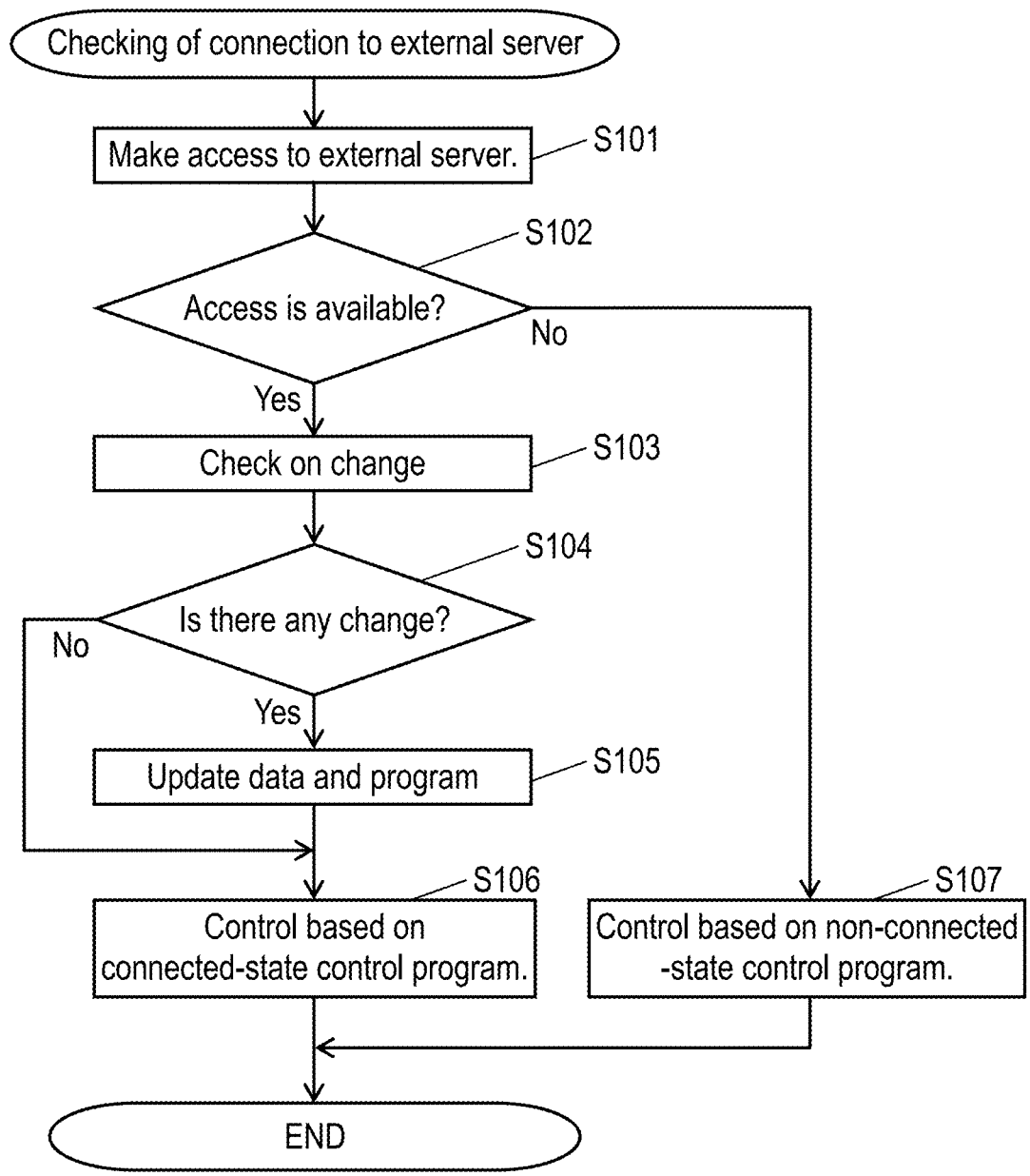
FIG. 8 is a flowchart illustrating the checking of connection to an external server by the ventilation control apparatus according to the embodiment.

Next, the checking of connection to an external server will be described with reference to FIG. 3 and FIG. 8. Note that FIG. 8 is a flowchart illustrating the checking of connection to an external server by ventilation control apparatus 2 according to the embodiment. In FIG. 8, S represents a step. Note that steps are not necessarily implemented in ascending order of number.

When ventilation control apparatus 2 is activated, determination unit 77 tries to make access to external server 61 via transmitting and receiving unit for broadband 12 (S101). Note that the address of external server 61 is registered beforehand to storage unit 10, for example.

Here, in the case where external server 61 is accessible, change checking unit 79 checks a change in external server 61 (S103). Targets for the check on change are a non-connected-state control program, a connected-state control program, and information on the target total exhaust volume. Here, changes in the non-connected-state control program and the connected-state control program are determined, for example, by comparing the version of each of the programs stored in external server 61 with the corresponding version of each of the programs stored in storage unit 10. The information on the target total exhaust volume is, for example, information on a predetermined time for exhaustion and the volume of exhaust that should be discharged from a house within the predetermined time that are specified by laws and regulations. The predetermined time used herein is, for example, 3 hours, and the volume of exhaust is a multiple of the volume of a building, for example, 1.5 times.

Here, when there is a change, data or a program that has been changed is acquired from external server 61, and the corresponding data or program in storage unit 10 is updated (Yes at S104→S105). A place for storage for the non-connected-state control program is non-connected-state control storage unit 74. A place for storage for the connected-state control program is connected-state control storage unit 75. A place for storage for the target total exhaust volume is a predetermined storage region in storage unit 10.

When there is no change, the above-mentioned updating operation is not performed (No at S104).

Then, when determination unit 77 determines that external server 61 is accessible, control determination unit 78 determines to perform connected-state control as a control method. Then, ventilation operation control unit 76 controls ventilator 70 via communication unit 9, based on the connected-state control program (S106).

In contrast, when determination unit 77 determines that external server 61 is not accessible, control determination unit 78 determines to perform non-connected-state control as a control method, without a check on change by change checking unit 79. Then, ventilation operation control unit 76 controls ventilator 70, based on the non-connected-state control program (No at S102→S107).

As described above, ventilation control apparatus 2 can dynamically change the control of ventilator 70 in accordance with a state of connection to external server 61. Therefore, in the case where ventilation control apparatus 2 is not connected to an external network at the time of moving into a house, the non-connected control allows, for example, ventilators made by the same manufacturer as that of ventilation control apparatus 2 to work in cooperation with each other to the extent possible. Then, after ventilation control apparatus 2 becomes connectable to the external network, these ventilators and ventilators made by a different manufacturer from that of ventilation control apparatus 2 also can work in cooperation with each other through the automatic use of external server 61. As a matter of course, it is not necessary that, after the external network is opened, a constructor makes a visit again to change the setting of ventilation control apparatus 2.

Furthermore, when the above-described function providing unit 66 capable of keeping an air-flow rate constant is used for exhauster 3, whereby, even in the case where environments of exhauster 3 are changed, it is not necessary to adjust or change the resistance (pressure loss) of, for example, a damper in a duct of each exhauster 3, and accordingly, a constructor need not to make a visit again.

In a ventilation control apparatus according to the prior art, when the apparatus is not connected to an external network, ventilator 70 functions merely as ventilator 70. In ventilation control apparatus 2 according to the present embodiment, even when ventilation control apparatus 2 is not connected to an external network, ventilators 70 made by the same manufacturer can work in cooperation with each other. Furthermore, when ventilation control apparatus 2 according to the present embodiment is connected to an external network, ventilators 70 made by the same manufacturer can work in cooperation with ventilators 70 made by mutually different manufacturers through the use of an external server. Hereinafter, non-connected-state control performed when ventilation control apparatus 2 is not connected to an external network, and connected-state control performed when ventilation control apparatus 2 is connected to an external network will be described.

[Non-Connected-State Control]

Figure 9:
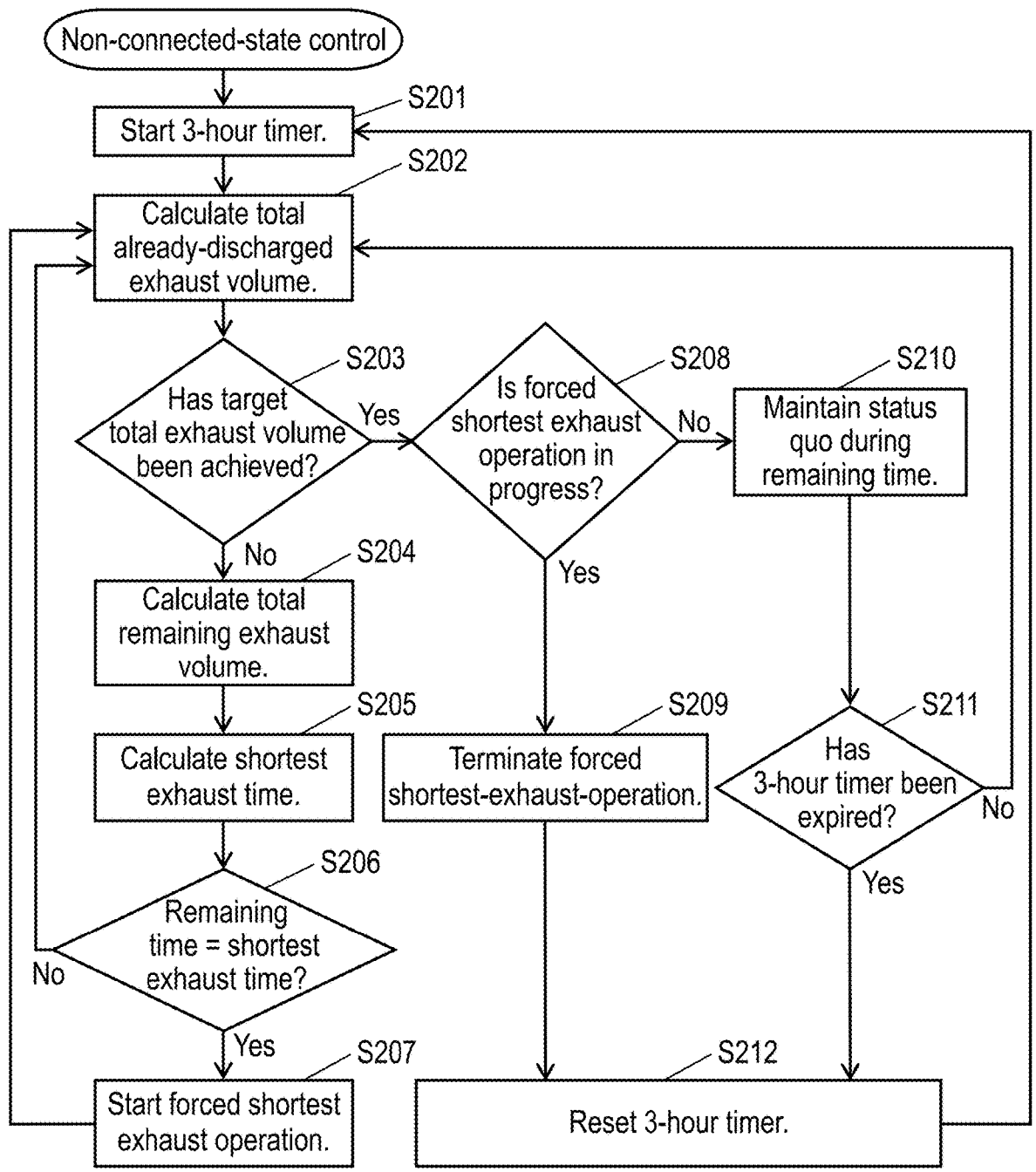
FIG. 9 is a flowchart illustrating non-connected-state control by the ventilation control apparatus according to the embodiment.

Next, non-connected-state control based on the non-connected-state control program of the ventilation control apparatus 2 will be described with reference to FIG. 3, FIG. 5, and FIG. 9. FIG. 9 is a flowchart illustrating non-connected state control by ventilation control apparatus 2 according to the embodiment. Note that ventilation control apparatus 2 is configured such that target total exhaust volume 46 set beforehand by information input terminal 8, predetermined time D (corresponding to the predetermined time, namely 3 hours in the present embodiment) to achieve target total exhaust volume 46, and a total volume as a target for ventilation in a building in accordance with laws and regulations are stored in storage unit 10. Targets for processing described below are a plurality of ventilators 70 connected to ventilation control apparatus 2, for example. However, in the case where ventilator 70 whose manufacturer is different from that of ventilation control apparatus 2 is connected to ventilation control apparatus 2, when ventilation control apparatus 2 is not connected to external server 61, this ventilator 70 and ventilator 70 whose manufacturer is the same as that of ventilation control apparatus 2 sometimes cannot work in cooperation with each other. In this case, only ventilators 70 capable of working in cooperation with each other shall cooperate, whereas ventilators 70 incapable of working in cooperation with others are only allowed to be ON-OFF controlled by ventilation control apparatus 2. Here, ventilators 70 capable of working in cooperation with each other are, for example, ventilators made by the same manufacturer as that of ventilation control apparatus 2, whereas ventilators 70 incapable of working in cooperation with others are, for example, ventilators made by a manufacturer different from that of ventilation control apparatus 2.

Ventilation control apparatus 2 starts a timer at starting point A to start the control of exhaust air-flow rate (S201). Time D is a time point at which 3 hours have been elapsed from starting point A. After the timer reaches time D, the timer is reset, and started again from 0. These operations are repeated as a routine work as long as there is no change in the setting of time D.

Here, it is assumed that, according to user's intention, wall-mounted ventilation fan 6 is operated at an exhaust air-flow rate of 30 cfm from starting point A, that is, a time for starting the timer, to time B, and stopped at time B. In this case, the time and exhaust air-flow rate (30 cfm) at starting point A and the time and exhaust air-flow rate (0 cfm) at time B are transmitted from transmitting unit 22 to exhaust volume acquisition unit 17 via receiving unit for ventilation 15, at the timing of starting point A and at the timing of starting point B, respectively.

Based on the transmitted information, exhaust volume acquisition unit 17 calculates an already-discharged exhaust volume from starting point A to time B, and transmits the calculation result to integrating unit 18. The calculation is performed at predetermined time intervals (for example, at one-second intervals), assuming that, the operation goes on with the already-given condition (the exhaust air-flow rate (30 cfm)), also between starting point A and time B inclusive during which information from ventilator 70 has not been given.

Integrating unit 18 calculates total already-discharged exhaust volume 43 by adding up the already-discharged exhaust volumes acquired by exhaust volume acquisition unit 17 (S202). Here, since only wall-mounted ventilation fan 6 is operated, the already-discharged exhaust volume of wall-mounted ventilation fan 6 is equal to the total already-discharged exhaust volume 43.

Note that exhaust volume control unit 11 always monitors whether or not total already-discharged exhaust volume 43 has reached target total exhaust volume 46 (S203).

Here, in the case where total already-discharged exhaust volume 43 has not reached target total exhaust volume 46, total remaining exhaust volume calculation unit 19 calculates total remaining exhaust volume 44 from the difference between total already-discharged exhaust volume 43 and target total exhaust volume 46 (No at S203→S204). Shortest-exhaust-time calculation unit 20 calculates shortest exhaust time 45 required to exhaust total remaining exhaust volume 44 with the maximum exhaust capacities of exhausters 3 connected to ventilation control apparatus 2 (S205). Note that the maximum exhaust capacity of ceiling-embedded ventilation fan 4 is 150 cfm, the maximum exhaust capacity of wall-mounted ventilation fan 6 is 30 cfm, and the maximum exhaust capacity of range hood fan 5 is 150 cfm.

Subsequently, exhaust setting unit 71 compares shortest exhaust time 45 with remaining time 42 until time D (S206). Here, at the time of time B, in the case where remaining time 42 is sufficiently longer than shortest exhaust time 45, exhaust setting unit 71 determines to maintain the present exhaust capacity (No at S206→S202).

It is assumed that, subsequently, while a user has not operated ventilator 70, the time reaches time C at which remaining time 42 becomes equal to shortest exhaust time 45. In this case, exhaust setting unit 71 instructs, via transmitting unit for ventilation 16, each of exhausters 3 to forcibly start exhaust operation with the maximum exhaust air-flow rate (forced shortest-exhaust operation) (Yes at S206→S207).

Here, in the above-described processing, the comparison between shortest exhaust time 45 and remaining time 42 is performed to determine whether or not to start forced shortest-exhaust operation (S206), but, for example, a comparison between the maximum exhaustible total volume (not illustrated) obtained by multiplying the maximum exhaust capacity of exhauster 3 by remaining time 42 and total remaining exhaust volume 44 may be performed. In this case, when the maximum exhaustible total volume is larger than total remaining exhaust volume 44, the status quo is maintained. In contrast, when the maximum exhaust-capable total volume is equivalent to or smaller than remaining total exhaust volume 44, forced shortest-exhaust operation is started to achieve the same effect.

In accordance with the above-described instruction, ceiling-embedded ventilation fan 4, wall-mounted ventilation fan 6, and range hood fan 5 start operation at time C with the maximum exhaust air-flow rate, namely, at 150 cfm, 30 cfm, and 150 cfm, respectively. With this operation, target total exhaust volume 46 is achieved at time D (repetition of S207→S202→S203).

After that, when the timer reaches time D; total remaining exhaust volume 44 and remaining time 42 become 0; and it is determined that target total exhaust volume 46 has been achieved, then exhaust setting unit 71 stops the forced shortest-exhaust-operation, and at the same time, resets the timer and total already-discharged exhaust volume 43 at 0 (S203→S208→S209→S212).

In FIG. 5, the forced shortest-exhaust-operation is performed between time C and time D, that is, in the last part of the remaining time 42 of the predetermined 3 hours. However, a case is assumed in which, in accordance with user's intention, any one or a plurality of exhausters 3 operates between time B and time C, so that target total exhaust volume 46 is achieved before the forced shortest-exhaust-operation is performed. In this case, exhaust setting unit 71 instructs to exhausters 3 not to perform the forced shortest-exhaust-operation but to maintain a status quo (S208→S210). Then, when 3 hours have elapsed, the timer and total already-discharged exhaust volume 43 are reset at 0 (Yes at S211→S212).

The above-described processing allows ventilation control apparatus 2 to control the operation of exhausters 3 so as to achieve target total exhaust volume 46 in the predetermined time. Furthermore, when a total exhaust volume owing to the operation of all connected exhausters 3 in the predetermined time, 3 hours, is counted, and exhausters 3 are controlled so as not to cause the total exhaust volume to considerably exceed target total exhaust volume 46, then energy saving effects can be achieved. Note that the above-described processing is non-connected-state control, but, when communication with external server 61 is available, updating of a predetermined time (for example, 3 hours) that may be possibly changed according to laws and regulations or updating of an exhaust volume that should be discharged from a house within the predetermined time allows control in which compliance with the latest laws and regulations are ensured. When the exhaust volume that should be discharged is updated, for example, the exhaust volume can be calculated by multiplying an exhaust volume acquired by control unit 73 by a total volume already stored in storage unit 10. Note that, for the calculation, different methods are employed depending on laws and regulations, and hence not limited to a particular one. Furthermore, since the above-described processing is non-connected-state control, a ventilator that cannot be allowed to cooperate with others is not taken into consideration when total already-discharged exhaust volume 43 is calculated, but, in terms of legal compliance, target total exhaust volume 46 can be surely discharged.

When receiving, from ventilation control apparatus 2 via receiving unit 29, information on the total exhaust volume from exhausters 3 (ceiling-embedded ventilation fan 4, wall-mounted ventilation fan 6, and range hood fan 5), air supply apparatus 7 operates to supply an air supply volume equivalent to the total exhaust volume to a house. This operation of air supply apparatus 7 aims to attain a balance between an exhaust volume and an air supply volume, and offers the effect of preventing an extreme negative pressure from being caused in a house.

Note that the above-described non-connected-state control is configured as follows. That is, when ventilator 70 can be set at two or more levels of exhaust capacities, exhaust setting unit 71 sets not only a turn-on time but also the exhaust capacities.

Furthermore, when total already-discharged exhaust volume 43 exceeds target total exhaust volume 46 within the predetermined time, exhaust setting unit 71 stops ventilators 70 from exhausting or prohibits ventilators 70 from operating.

Furthermore, exhaust setting unit 71 achieves target total exhaust volume 46 with the maximum exhaust capacities of exhausters 3 during remaining time 42.

[Connected-State Control]

Next, connected-state control based on a connected-state control program by ventilation control apparatus 2 will be described using FIG. 2 and FIG. 3.

When determination unit 77 determines that communication with external server 61 is available, ventilation operation control unit 76 operates based on a connected-state control program. Examples of the operation include various operations. As an example, the operation of range hood fan 5 (a first ventilator) and wall-mounted ventilation fan 6 (a second ventilator) that are provided in the same room will be described here. It is assumed that a manufacturer of range hood fan 5 is different from a manufacturer of wall-mounted ventilation fan 6. For example, when range hood fan 5 starts operation, information on the operation, such as exhaust capacity and ambient temperature, is transmitted via ventilation operation control unit 76 to external server 61a made by the same manufacturer as that of range hood fan 5. External server 61a transmits the received information on the operation to external server 61b made by the same manufacturer as that of wall-mounted ventilation fan 6, that is, a different manufacturer from that of range hood fan 5. Based on the information on the operation of range hood fan 5, external server 61b transmits, for example, a command for changing the operation to wall-mounted ventilation fan 6. Here, examples of the command for changing the operation include ON/OFF switching and change in air-flow rate. Ventilation operation control unit 76 receives the above-mentioned command for changing the operation from external server 61b via communication unit 9, and transmits the command to wall-mounted ventilation fan 6 via communication unit 9.

When receiving the command, wall-mounted ventilation fan 6 causes function providing unit 66 to operate in accordance with the command. This operation allows ventilators 70 provided by different manufacturers to cooperate with each other.

Note that, since the connected-state control is not limited to particular control, further details of thereof will be omitted.

[Provided Information and Energy Saving Control by Calculation Unit]

FIG. 10 is a diagram illustrating an example of provided information on ventilators 70 according to the embodiment. In the present embodiment, examples of provided information 47 dealt in storage unit 26, storage unit 27, and storage unit 30 of the above-described ventilators 70, such as ceiling-embedded ventilation fan 4 and wall-mounted ventilation fan 6, are operation states and exhaust air-flow rates. However, as illustrated in FIG. 10, product information 58 specific to ventilator 70 and present information 59 on ventilator 70 may be configured to be transmitted as provided information 47 to ventilation control apparatus 2. Here, product information 58 include, for example, product ID 51, exhaust capacity 52 of ventilator 70 that indicates settable air-flow rates, and on-board sensor 53, that is, the type of a sensor incorporated into ventilator 70. Present information 59 include, for example, present air-flow rate 54 indicating a present operation state, sensor state 55 indicating a detection state of the on-board sensor, forced operation 56 indicating whether or not a user forcibly operates the ventilator, and power consumption 57 indicating power consumption at the present air-flow rate.

With product information 58 and present information 59 specific to ventilator 70, calculation unit 72 can grasp, for example, electrical characteristics of each of connected ventilators 70, and select a combination of ventilators 70 that achieves the minimum power consumption. Thus, ventilation control apparatus 2 not only can achieve target total exhaust volume 46, but also can realize exhaust control to reduce power consumption.

FIG. 11 is a diagram illustrating combinations of ventilators 70, the combinations being selected by ventilation control apparatus 2 according to the embodiment. FIG. 11 illustrates combinations of ventilators 70 in the case where an exhaust air-flow rate required in a house in a predetermined time is set at 250 cfm. In this case, using information on the air-flow rates and power consumption of ventilators 70, calculation unit 72 selects optimal combination 65 that achieves the minimum power consumption, whereby ventilators 70 can be controlled.

INDUSTRIAL APPLICABILITY

As described above, the ventilation control apparatus and the ventilation system according to the present invention allow a dynamic change in the control of a ventilator in accordance with the state of connection to an external server, and therefore are applicable to, for example, stand-alone houses and multifamily dwelling houses such as apartments.

REFERENCE MARKS IN THE DRAWINGS

1 . . . ordinary house
2 . . . ventilation control apparatus
3 . . . exhauster
4 . . . ceiling-embedded ventilation fan
5 . . . range hood fan
6 . . . wall-mounted ventilation fan
7 . . . air supply apparatus
8 . . . information input terminal
9 . . . communication unit
10, 26, 27, 30 . . . storage unit
11 . . . exhaust volume control unit
12 . . . transmitting and receiving unit for broadband
13 . . . exhaust capacity storage unit
14 . . . target total exhaust volume storage unit
15 . . . receiving unit for ventilation
16 . . . transmitting unit for ventilation
17 . . . exhaust volume acquisition unit
18 . . . integrating unit
19 . . . total remaining exhaust volume calculation unit
20 . . . shortest-exhaust-time calculation unit
22, 23, 28 . . . transmitting unit
24, 25, 29 . . . receiving unit
31 . . . CPU
32 . . . RAM
33 . . . ROM
34 . . . HDD
36 . . . wireless communication module
37 . . . wired communication module 38 . . . in-home network
40 . . . microcomputer
41 . . . internal bus
42 . . . remaining time
43 . . . total already-discharged exhaust volume
44 . . . total remaining exhaust volume
45 . . . shortest exhaust time
46 . . . target total exhaust volume
47 . . . provided information
51 . . . product ID
52 . . . exhaust capacity
53 . . . onboard sensor
54 . . . present air-flow rate
55 . . . sensor state
56 . . . forced operation
57 . . . power consumption
58 . . . product information
59 . . . present information
60 . . . external network
61 . . . external server
65 . . . combination
66 . . . function providing unit
70 . . . ventilator
71 . . . exhaust setting unit
72 . . . calculation unit
73 . . . control unit
74 . . . non-connected-state control storage unit
75 . . . connected-state control storage unit
76 . . . ventilation operation control unit
77 . . . determination unit
78 . . . control determination unit
79 . . . change checking unit
80 . . . motor
81 . . . motor control circuit
82 . . . stator
83 . . . rotor
84 . . . alternating-current conversion circuit
85 . . . smoothing capacitor
86 . . . inverter circuit
87a, 87b, 87c, 87d, 87e, 87f . . . switching element
88 . . . first arm
89 . . . second arm
90 . . . third arm
91 . . . shunt resistance
92 . . . amplifying unit
93 . . . current detection unit
94 . . . rotation detection unit
95 . . . airflow rate calculation unit
96 . . . speed control unit
97 . . . target air-flow rate calculation unit
98 . . . amplification factor changing unit

The invention claimed is:

1. A ventilation controller communicably connected to a plurality of ventilators capable of carrying air between inside and outside of a building, and configured to control operation of the ventilators, the ventilation controller comprising:
a ventilation transmitter/receiver configured to communicate with the ventilators via an in-home network;
a broadband transmitter/receiver configured to communicate via an external network with an external server provided outside the building;
a ventilation operation controller configured to determine whether or not communication with the external server via the external communication module is available and to provide a determination result, configured to determine a control method of controlling the operation of the ventilators based on the determination result, and configured to control the ventilators based on the control method;
a non-connected-state control storage configured to store a non-connected-state control program, the non-connected-state control program being a control specification for the ventilators for a case in which the broadband transmitter/receiver is not connected to the external server; and
a connected-state control storage configured to store a connected-state control program, the connected-state control program being a control specification for the ventilators for a case in which the broadband transmitter/receiver is connected to the external server,
wherein, when the ventilation operation controller determines that the broadband transmitter/receiver is not connected to the external server, the ventilation operation controller controls the ventilators so as to achieve a target total exhaust volume, based on the non-connected-state control program determined by the ventilation operation controller and the information on the target total exhaust volume set by user including information on a predetermined time for exhaustion and information on the volume of exhaust that should be discharged from the building within the predetermined time, and
wherein, when the ventilation operation controller determines that the broadband transmitter/receiver is connected to the external server, the ventilation operation controller controls the ventilators, based on the connected-state control program determined by the ventilation operation controller.

2. The ventilation controller according to claim 1, wherein the ventilation operation controller exercises control based on the connected-state control program so as to acquire the connected-state control program stored in the external server and control the ventilators, based on the connected-state control program stored in the external server.

3. The ventilation controller according to claim 1, wherein the ventilation operation controller exercises control based on the connected-state control program so as to
transmit, to the external server, information about operation of a first ventilator among the ventilators,
acquire, from the external server, information about a change in operation of a second ventilator among the ventilators, and
transmit, to the second ventilator, a command for changing operation of the second ventilator, based on the information about the change.

4. The ventilation controller according to claim 1, further comprising:
a target total exhaust volume storage configured to store a target total exhaust volume that is a target total volume of exhaust to be discharged within a predetermined time;
an exhaust capacity storage configured to store an exhaust capacity of each of at least one of the ventilators connected to the ventilation controller;
an exhaust volume acquisitor configured to acquire an already-discharged exhaust volume that is discharged from each of the at least one of the ventilators connected to the ventilation controller;

an integrator configured to calculate a total already-discharged exhaust volume by adding up the already-discharged exhaust volumes acquired by the exhaust volume acquisitor; and
an exhaust volume controller configured to control the at least one of the ventilators connected to the ventilation controller, based on the total already-discharged exhaust volume obtained by integration by the integrator, the target total exhaust volume stored in the target total exhaust volume storage, a remaining time until the predetermined time, and exhaust capacities of the at least one of ventilators stored in the exhaust capacity storage, so that exhaust in the target total exhaust volume is achieved within the remaining time.

5. The ventilation controller according to claim 4, wherein the exhaust volume controller includes:
a shortest-exhaust-time calculator configured to calculate a shortest exhaust time to achieve the target total exhaust volume with the exhaust capacities;
a total remaining exhaust volume calculator configured to, based on the total already-discharged exhaust volume calculated by the integrator at a timing at least the shortest exhaust time before the predetermined time elapses and the target total exhaust volume, calculate a total remaining exhaust volume that is a total remaining exhaust volume necessary for achieving the target total exhaust volume; and
an exhaust setter configured to set a turn-on time for at least one of the ventilators connected to the ventilation controller, based on the total remaining exhaust volume calculated by the total remaining exhaust volume calculator.

6. The ventilation controller according to claim 5, further comprising
a calculator configured to calculate a control pattern for at least one of the ventilators, based on the remaining time, an energy efficiency per unit time of each of the at least one of the ventilators, and an exhaust volume corresponding to the energy efficiency, the control pattern achieving exhaust of the target total exhaust volume within the remaining time and achieving to the highest energy efficiency,
wherein the exhaust setter controls the at least one of the connected ventilators, based on a result of calculation by the calculator.

7. The ventilation controller according to claim 1, wherein the ventilation operation controller exercises control based on the connected-state control program so as to acquire the connected-state control program stored in the external server and control the ventilators, based on the connected-state control program stored in the external server and the target total exhaust volume acquired from the external server.

8. A ventilation system, comprising:
a plurality of ventilators capable of carrying air between inside and outside of a building; and
a ventilation controller communicably connected to the ventilators and configured to control operation of the ventilators,
wherein the ventilation controller includes:
a ventilation transmitter/receiver configured to communicate with the ventilators via an in-home network;
a broadband transmitter/receiver configured to communicate via an external network with an external server provided outside the building;
a ventilation operation controller configured to determine whether or not communication with the external server via the external communication module is available and to provide a determination result, configured to determine a control method of controlling the operation of the ventilators based on the determination result, and configured to control the ventilators based on the control method;
a non-connected-state control storage configured to store a non-connected-state control program, the non-connected-state control program being a control specification for the ventilators for a case in which the broadband transmitter/receiver is not connected to the external server; and
a connected-state control storage configured to store a connected-state control program, the connected-state control program being a control specification for the ventilators for a case in which the broadband transmitter/receiver is connected to the external server,
wherein, when the ventilation operation controller determines that the broadband transmitter/receiver is not connected to the external server, the ventilation operation controller controls the ventilators so as to achieve a target total exhaust volume, based on the non-connected-state control program determined by the ventilation operation controller and the information on the target total exhaust volume set by user including information on a predetermined time for exhaustion and information on the volume of exhaust that should be discharged from the building within the predetermined time, and
wherein, when the ventilation operation controller determines that the broadband transmitter/receiver is connected to the external server, the ventilation operation controller controls the ventilators, based on the connected-state control program determined by the ventilation operation controller,
wherein the ventilator includes:
a motor; and
a motor control circuit configured to control the motor,
wherein the motor control circuit includes:
an inverter circuit including three arms connected in a three-phase bridge form, and configured to apply a three-phase pulse-width-modulation (PWM) alternating-current voltage to the motor,
the three arms each having an upper stage and a lower stage and including two switching elements, the two switching elements being configured to perform opposing ON/OFF operations and connected in series to a direct-current voltage;
a shunt resistance inserted between the lower stage of each of the phases of the inverter circuit and a negative potential side of the inverter circuit;
an amplifier configured to amplify a voltage between terminals of the shunt resistance;
a current detector configured to detect, from an output of the amplifier, a current of each of the phases that is passing through the motor;
a rotation detector configured to detect the rotational speed of the motor, based on the current detected by the current detection unit;
an air-flow rate calculator configured to compare a current value of any one of the phases whose current values have been detected by the current detector with a target current value corresponding to a target air-flow rate, and compare the rotational speed detected by the rotation detector with a target rotational speed corresponding to the target air-flow rate; and a speed controller configured to control the rotational speed of the motor by changing a duty for the inverter circuit, based on a result of comparison by the air-flow rate calculator.

9. A ventilation controller communicably connected to a plurality of ventilators capable of carrying air between inside and outside of a building, and configured to control operation of the ventilators, the ventilation controller comprising:
- a ventilation transmitter/receiver configured to communicate with the ventilators via an in-home network;
- a broadband transmitter/receiver configured to communicate via an external network with an external server provided outside the building;
- a ventilation operation controller configured to determine whether or not communication with the external server via the broadband transmitter/receiver is available and to provide a determination result, configured to determine a control method of controlling the operation of the ventilators based on the determination result, and configured to control the ventilators based on the control method;
- a target total exhaust volume storage configured to store a target total exhaust volume that is a target total volume of exhaust to be discharged within a predetermined time;
- an exhaust capacity storage configured to store an exhaust capacity of each of at least one of the ventilators connected to the ventilation controller;
- an exhaust volume acquisitor configured to acquire an already-discharged exhaust volume that is discharged from each of the at least one of the ventilators connected to the ventilation controller;
- an integrator configured to calculate a total already-discharged exhaust volume by adding up the already-discharged exhaust volumes acquired by the exhaust volume acquisitor; and
- an exhaust volume controller configured to control the at least one of the ventilators connected to the ventilation controller, based on the total already-discharged exhaust volume obtained by integration by the integrator, the target total exhaust volume stored in the target total exhaust volume storage, a remaining time until the predetermined time, and exhaust capacities of the at least one of ventilators stored in the exhaust capacity storage, so that exhaust in the target total exhaust volume is achieved within the remaining time.

* * * * *